(12) United States Patent
Manthei et al.

(10) Patent No.: US 6,910,445 B1
(45) Date of Patent: Jun. 28, 2005

(54) SYSTEM AND METHOD FOR CONTAINMENT AND TESTING OF EXTREMELY TOXIC SUBSTANCES

(75) Inventors: James H. Manthei, Joppa, MD (US); Charles L. Crouse, Forest Hill, MD (US); Ruth A. Way, Conowingo, MD (US); David A. McCaskey, Parkville, MD (US); John C. Carpin, Perry Hall, MD (US); David C. Burnett, Belcamp, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/781,494

(22) Filed: Feb. 18, 2004

Related U.S. Application Data
(60) Provisional application No. 60/449,430, filed on Feb. 24, 2003.

(51) Int. Cl.$^7$ ................................................. A01K 1/03
(52) U.S. Cl. ................ 119/420; 119/416; 119/417; 119/418; 119/419; 119/421; 312/1; 600/21
(58) Field of Search .................. 119/416–421, 671, 119/677, 678; 312/1; 600/21

(56) References Cited

U.S. PATENT DOCUMENTS

| | | | | |
|---|---|---|---|---|
| 2,705,489 A | * | 4/1955 | Trexler | 600/21 |
| 2,786,740 A | * | 3/1957 | Taylor et al. | 312/1 |
| 3,505,989 A | * | 4/1970 | Truhan | 600/21 |
| 3,536,370 A | * | 10/1970 | Harris-Smith et al. | 312/1 |
| 3,654,534 A | * | 4/1972 | Fischer | 361/215 |
| 4,111,753 A | * | 9/1978 | Folsom et al. | 435/3 |
| 4,305,347 A | * | 12/1981 | Hemenway et al. | 119/420 |
| 4,348,985 A | * | 9/1982 | Leong | 119/420 |
| 4,657,004 A | * | 4/1987 | Coffey | 128/869 |
| 6,651,587 B1 | * | 11/2003 | DeFord et al. | 119/420 |

FOREIGN PATENT DOCUMENTS

| | | | | |
|---|---|---|---|---|
| GB | 2276088 A | * | 9/1994 | A01K/1/03 |

* cited by examiner

*Primary Examiner*—Jeffrey L. Gellner
*Assistant Examiner*—Andrea M. Valenti
(74) *Attorney, Agent, or Firm*—Ulysses John Biffoni

(57) ABSTRACT

A containment and test system for extremely toxic substances includes a fume hood, a containment compartment such as glove bag or box, positioned within the fume hood, a source of a non-reactive gas to provide a stable environment within the containment compartment, an inline moisture trap coupled to the source of non-reactive gas to dry the non-reactive gas, an ion neutralizer coupled to the source of non-reactive gas to reduce static charges within the containment compartment, a staging area for preparing test samples, a balance positioned within the containment compartment, a stanchion positioned within the fume hood for holding a test animal, and decontaminating apparatus for safely disposing of any toxic substance residue.

16 Claims, 2 Drawing Sheets

SYSTEM AND METHOD FOR CONTAINMENT AND TESTING OF EXTREMELY TOXIC SUBSTANCES

CROSS REFERENCE TO RELATED APPLICATIONS

This application claims the benefit of priority from U.S. Provisional Patent Application Ser. No. 60/449,430, filed on Feb. 24, 2003.

GOVERNMENT INTEREST

The invention described herein may be manufactured, licensed, and used by or for the U.S. Government.

TECHNICAL FIELD

The present invention relates generally to testing of extremely toxic substances and in particular to a system and method for containment and testing on test animals of extremely toxic substances such as chemical, biological, or radiological warfare agents.

BACKGROUND

The threat that chemical, biological, and radiological (CBR) warfare agents may be used on military forces and civilian populations is of growing concern. Unfortunately, the modes of action of many CBR warfare agents are not yet well understood, and effective antidotes and treatments, in many cases, have yet to be developed. Thus, there is an immediate need for research to gain a greater understanding of the operation and effects of CBR warfare agents.

The term "toxic substance" as used herein is intended to include toxic or hazardous chemical, biological or radioactive substances, particularly those that may be harmful or fatal in extremely small doses. For example, a single infectious dose of anthrax is believed to be in the range of 10 nanograms, or about 1/100th the size of a single speck of dust. A number of challenges are presented when working with such minute amounts of highly toxic substances. In particular, toxic substance particles are frequently difficult or impossible to see with the naked eye, can become easily airborne and will disperse rapidly in the air if not properly contained. Moreover, such particles can easily become electrostatically charged and will adhere to surfaces, rendering removal and containment even more difficult. While containment and isolation of toxic substances is of paramount concern, at the same time, experiments must be administered with a high degree of precision so that the results are reliable and repeatable. To obtain meaningful results from such experiments, which require exacting procedures and may take many hours to conduct, the containment environment should be as ergonomic as possible and provide all of the tools needed to prepare the materials used in the experiment within easy reach of an operator. These and other problems are solved, at least in part, by embodiments of toxic substance containment and testing systems according to the present invention.

SUMMARY

In general, in one aspect, a toxic substance containment and test system includes a fume hood comprising an air exhaust system and a toxic substance filter, a compartment positioned within the fume hood, comprising an airtight seal, a pair of glove ports through which an operator can manipulate objects within the compartment, and an exit port for removing a test sample, a source of a non-reactive gas coupled to the compartment to provide a stable atmosphere within, an inline moisture trap coupled to the source of non-reactive gas to dry the non-reactive gas, an ion neutralizer coupled to the source of non-reactive gas to reduce static charges within the compartment, a staging area in the compartment for preparing a sample under test, a balance positioned within the compartment to measure a substance under test, a stanchion positioned within the fume hood for holding a test animal, and decontaminating apparatus for cleaning up toxic substance residue.

In general, in another aspect, a patch for transdermal testing of toxic substances on an animal subject, includes a first layer of flexible material having a top to which an adhesive has been applied and a bottom, a second layer including a thin plastic stiffener and having a top and a bottom, the top of the second layer adhered to the bottom of the first layer, a third layer including a soft, fibrous material and having a top and a bottom, the top of the third layer adhered to the bottom of the second layer, and a measured dose of toxic substance deposited to the adhesive surface on the top of the first layer.

In general in another aspect, a method for testing and containment of toxic substances, includes positioning a containment compartment within a vented fume hood, infusing the compartment with a source of non-reactive gas, filtering the source of non-reactive gas to remove moisture, coupling an ion neutralizer to the source of non-reactive gas to reduce static charges within the containment compartment, measuring a test amount of toxic substance, preparing a test patch including the toxic substance within the compartment, withdrawing the test patch from the containment compartment, dermally applying the test patch to a test subject animal positioned in a stanchion within the vented fume hood, cleaning up any toxic substance residue, and monitoring the test animal to determine an effect, if any, of application of the test amount of toxic substance.

DETAILED DESCRIPTION

In the following detailed description, reference is made to the accompanying drawings that form a part hereof and in which are shown by way of illustration specific embodiments in which the invention, as claimed, may be practiced. This invention may, however, be embodied in many different forms and should not be construed as limited to the embodiment set forth, rather, these embodiments are provided so that this disclosure will be thorough and complete, and will fully convey the scope of the invention to those skilled in the art. As will be appreciated by those of skill in the art, the present invention may be embodied in methods and devices.

Figure 1:
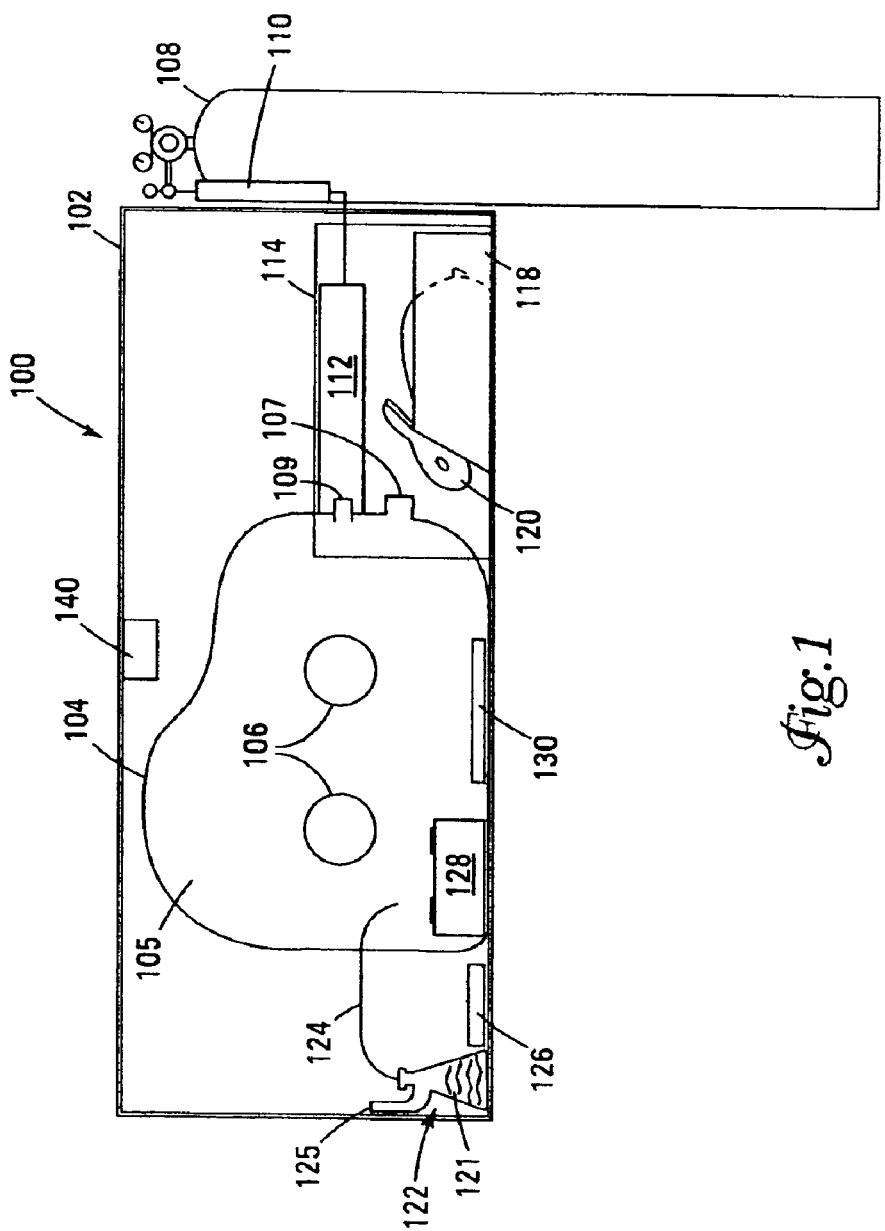
FIG. 1 is a schematic profile view of an embodiment of a toxic substance containment and testing system according to the present invention.

FIGS. 1 shows a schematic profile view of an embodiment of a toxic substance containment and testing system 100 according to the present invention. The system 100 is designed to conduct experiments involving extremely toxic solids, including chemical and biological warfare agents, and the like, in a safe and effective manner. As a first level of protection, the system 100 provides careful management of air flow to protect the ambient environment from contamination. To provide such air flow management, the system 100 includes a filtered fume hood 102, which provides a ventilated enclosure in which toxic gases, vapors, particles and fumes are contained, vented and chemical-biological-radioactive (CBR) filtered in a safe manner. In general, a CBR filter will include a Class 1 high efficiency particulate air (HEPA) and/or ultra low penetration air (ULPA) filter and may also include an ultraviolet or radioactive germicidal trap, or the like. Care should be exercised to ensure that fume hood 102 provides containment and filtering appropriate for the substances under test.

As a further precaution, when conducting tests involving extremely toxic substances, personal protective gear such as a protective mask, gloves, laboratory clothing, boots or safety shoes and the like, should be worn by all personnel working in the laboratory area.

The process of applying a measured amount of an extremely toxic solid to a test strip or test patch is exacting and the test may require that the amount of toxic substance be measured to an accuracy of within a few micrograms, or less. Such extremely lightweight toxic solid particles can become airborne by even the slightest air current or disturbance. For example, anthrax spores are extraordinarily concentrated and lightweight, in the range of 1 trillion spores per gram and will disperse rapidly in the atmosphere if unconfined. To insure that all toxic solid particles are safely contained, preparation of toxic substance test materials and test patches in system 100 takes place within a sealed compartment 105, which is positioned within fume hood 102. While a number of different sealed compartments can be employed, a glove bag is generally preferred as a containment device, since it provides an extremely clean, sealed environment, which can be easily and safely disposed of at the conclusion of an experiment, together with any toxic substance residue that may remain within. In some embodiments, a durable enclosure such as a glove box or other sealed compartment may be employed, however, cleanup of toxic substance residue within such durable compartments will generally be more labor intensive and time consuming.

Glove bag 104 includes two glove ports 106 fitted with arm-length gloves so that objects placed inside the compartment 105 can be manipulated by an operator. Glove bag 104 also includes at least one exit port 107 for removing objects and at least one port 109 for infusion of process gasses. Exit port 107 preferably provides an airlock seal to prevent any possible escape of toxic substances when the port is not in use. In some examples, a double seal may be employed to provide additional protection. In general, glove bag 104 should be constructed of a flexible, transparent, gas-impermeable and static dissipative plastic material and glove ports 106 should be sufficiently flexible to allow precise manipulation of extremely small objects within the compartment 105.

To facilitate handling of the toxic substances, system 100 provides a dry, stable, non-reactive and charge neutralized environment. While a variety of non-reactive process gases may be employed, (argon, or neon, e.g.) nitrogen gas is preferred since it is easily available and well suited to most CBR experimental applications. Nitrogen gas from a canister 108 is passed through an inline moisture trap 110 which will generally include a desiccant such as alumina or silica gel, a moisture capturing membrane or molecular sieve, or the like. The dried nitrogen gas is also passed through an ion neutralizer 112 such as a Thermo-Systems, Inc. Krypton-85 2 milicurie source. Ion neutralizer 112 brings particle charge distribution levels to a minimum Boltzmann's distribution of charge and serves to minimize static charges within the glove bag 104 so that particles will not adhere to surfaces such as the walls of glove bag 104. Appropriate sensors and controllers may be employed to monitor and control electrostatic levels, humidity, temperature, gas pressure and concentration and other environmental variables, to maintain the proper experimental environment, as would be familiar to those of skill in the art.

The dried, charge-neutralized nitrogen gas is emitted from the ion neutralizer 112 behind a Plexiglas air shield 114 and passes through port 109 to inflate glove bag 104. The flow of nitrogen gas should be adjusted as necessary to provide a continuous low-level positive pressure sufficient to maintain inflation of glove bag 104 while being careful to minimize turbulence that night disturb the test materials.

Also enclosed within the glove bag 104, is a balance 128 for accurately measuring the toxic substance under test. In this embodiment, a Mettler/Toledo UMT 2 microgram balance has been used. Balance 128 includes a closed chamber with a small stainless steel weighing pan. To avoid disturbing the balance 124 and to enable a second operator to assist the operator working through the glove ports 106, a balance control unit and display 126 is located outside the glove bag 104. A staging platform 130 such as a stainless steel tray is provided inside the glove bag 104 within easy reach of the operator and may be used for test sample preparation.

The system 100 also includes decontaminating apparatus 122 for cleaning up and neutralizing toxic substance residue in glove bag 104. Decontaminating apparatus 122 provides a flexible suction hose 124 having an inlet located inside the glove bag 104 to vacuum up any test material residue. Flexible suction hose 124 passes through a sealed opening in the wall of compartment 105 and includes an outlet attached to a sealed beaker of decontaminating solution 121 which in turn is connected to a vacuum source (not shown) at a beaker outlet 125. Selection of an appropriate decontamination solution 121 will depend on the type of toxic solid under investigation. In one example, where biological solid toxins are to be studied, a 5% bleach solution may be used. After the vacuum source is activated, suction hose 124 can be maneuvered within the glove bag 104 to pick up any residual toxic solid materials. The vacuum source draws the residual toxic solid material into the decontaminating solution 124 where it is safely neutralized and contained. Decontaminating apparatus 122 can also be used to deflate the glove bag 104.

Test material particles, due to their size, may be very difficult to see under ordinary broadband white light. Various techniques can be used to enhance the visibility of small particles. For example, a source of illumination 140 can be configured to excite a fluorescent property of a test material or of a fluorescent dye that has been added to a test material. In another example, polarized light and corresponding polarization filters may be used to enhance the visibility of a test material. In another example, infrared detection may be employed to improve visibility. Alternatively, techniques such as differential interference contrast and optical interferometry, and the like may be employed to enhance particle contrast. Operators can also be equipped with monocular or binocular headband magnifiers. In still other examples, one or more optical probes or cameras can be positioned within the glove bag 104 to provide magnified images for viewing on a video display.

Figure 2A:
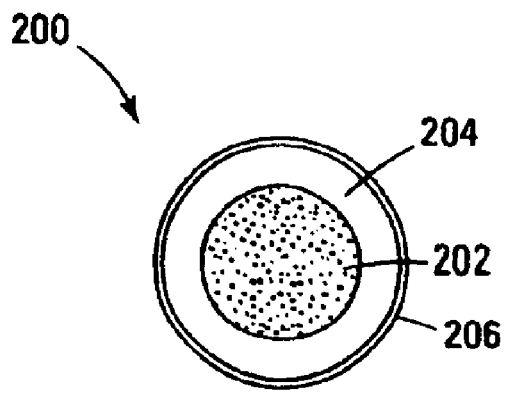
FIG. 2A is a plan view of an embodiment of a test patch for use in a toxic substance containment and testing system according to the present invention.
Figure 2B:
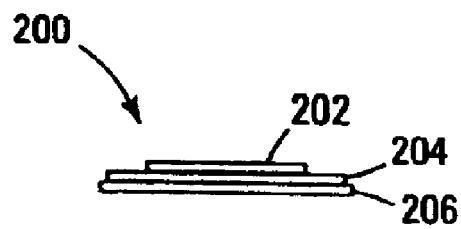
FIG. 2B is a side view of an embodiment of a test patch for use in a toxic substance containment and testing system according to the present invention.

FIGS. 2a and 2b show plan and side views, respectively, of an embodiment of a test patch 200 in accordance with the present invention. Test patch 200 is suitable for transdermal administration of samples under test to a animal test subject 120 within the toxic substance containment and testing system 100. Test patch 200 includes three layers: a first layer 202 of a flexible material having an adhesive on the top, a stiffener 204 underlying and affixed to the bottom of first layer 202 and a backing layer 206 adhered to the underside of the stiffener 204. In this example, first layer 202 is made from a small (in this example, 16 mm) disc of a two-sided carpet or similar tape. The adhesive on the top of first layer 202 should have a high degree of viscosity so that test particles will adhere to test patch 200 and test patch 200 will firmly adhere to the skin of a test animal. In addition, the adhesive should be selected to ensure that it does not react with the test material, or otherwise interfere with the test such as by causing an adverse reaction in the text animal. First layer 202 is affixed to the top of a stiffener 204 such as a larger diameter thin plastic disc (in this example, 23 mm) to provide additional stiffness. The bottom of stiffener 204 is adhered to a backing 206 of soft fibrous material such as 3M® micropore surgical adhesive tape. Backing 206 is about the same size as stiffener 204 and facilitates smooth sliding of the test patch 200 over surfaces and preferably possesses antistatic properties to minimize any static charges that could accumulate on the patch 200 from sliding over a surface.

Figure 3:
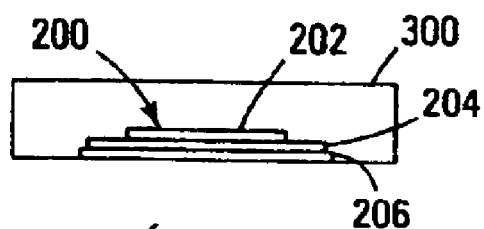
FIG. 3 is a side view of an embodiment of the test patch of FIGS. 2A and 2B that includes a protective cover.

FIG. 3 shows an embodiment of test patch 200 to which protective cover 300 has been added. Cover 300 is preferably cap shaped, made of a plastic material and dimensioned to completely contain the test patch 200 area where test material has been deposited to ensure that the test material will not be disturbed when the test patch 200 is moved.

An example of a test conducted in accordance with one embodiment of the present invention will now be described. One or more test samples are placed in glove bag 104. A test patch 200 is placed with the exposed adhesive side facing up on the balance 128 and the balance is tared. Next, an appropriate amount of test sample is deposited onto the test patch 200 by the operator. The operator, working through the glove ports 106, manually draws a quantity of test sample into a pipette and carefully deposits a small amount of the material onto the sticky adhesive tape disc 202 of the test patch 200. The test sample material will adhere to the exposed adhesive of test patch 200. The balance 128 is checked to determine whether additional test sample material is needed. Small amounts of test sample material are added to the test patch 200 until the correct weight of test sample material has been attained. Then, the operator places the test patch 200 into a cover 300 and passes the covered test patch 200 out of the glove bag 104 through the exit port 107 behind air shield 114 where a second operator, using a forceps, grasps the cover 300 that contains the test patch 200, removes the cover 300 and applies the test patch 200 to the back of the test animal 120 held in a stanchion 118.

After the text patch 200 has been applied, the test animal 120 can be removed from system 100 and placed into another CBR filtered fume hood and a suitable cage for observation and monitoring. Decontaminating apparatus 122 can then be used to clean up any toxic substance residue and to deflate glove bag 104.

CONCLUSION

As has been shown, embodiments of the present invention safely and accurately weigh, contain, and allow for the administration of extremely toxic or biohazardous materials to test animals. A number of embodiments of the invention defined by the following claims have been described. Nevertheless, it will be understood that various modifications to the described embodiments may be made without departing from the spirit and scope of the claimed invention. For example, a glove box or other containment compartment may be employed in place of a glove bag in some embodiments. Other embodiments may provide alternative means for neutralizing toxic substance residue such as by irradiation or by spraying the containment compartment with a decontaminant. Accordingly, other embodiments are within the scope of the invention, which is limited only by the following claims.

What is claimed is:

1. A toxic substance containment and test system, comprising:
   a fume hood comprising an air exhaust system and a toxic substance filter;
   a containment compartment positioned within the fume hood, comprising an airtight seal, a pair of glove ports through which an operator can manipulate objects within the containment compartment, and an exit port for removing a test sample;
   a source of a non-reactive gas coupled to the containment compartment to provide a stable atmosphere within;
   an inline moisture trap coupled to the source of non-reactive gas to dry the non-reactive gas;
   an ion neutralizer coupled to the source of non-reactive gas to reduce static charges within the containment compartment;
   a staging area in the containment compartment for preparing the test sample;
   a balance positioned within the containment compartment to measure the test sample;
   a stanchion positioned within the fume hood for holding a test animal; and
   decontaminating apparatus for cleaning up toxic substance residue.

2. The toxic substance containment and test system of claim 1 wherein the containment compartment comprises a glove bag.

3. The toxic substance containment and test system of claim 1 wherein the source of non-reactive gas comprises nitrogen.

4. The toxic substance containment and test system of claim 1 further comprising an air shield positioned in front of the exit port and the stanchion.

5. The toxic substance containment and test system of claim 1 wherein the decontaminating apparatus comprises a suction hose having an inlet and an outlet, the suction hose inlet positioned within the compartment and the suction hose outlet coupled to a toxic substance vacuum source.

6. The toxic substance containment and test system of claim 5 wherein the decontaminating apparatus further comprises a container of decontaminating solution coupled between the suction hose outlet and the toxic substance vacuum source.

7. The toxic substance containment and test system of claim 6 wherein the decontaminating solution comprises bleach.

8. The toxic substance containment and test system of claim 1 further comprising means to enhance the visibility of a substance under test.

9. The toxic substance containment and test system of claim 8 wherein the means to enhance the visibility of the substance under test comprises a source of illumination.

10. The toxic substance containment and test system of claim 8 wherein the source of illumination provides light at a wavelength to excite a fluorescent property of the substance under test.

11. The toxic substance containment and test system of claim 10 wherein the fluorescent property of the substance under test is induced by a fluorescent dye.

12. A toxic substance containment and test system, comprising:

means for venting and filtering toxic airborne particulate substances;

containment means comprising a sealed compartment and glove ports through which an operator can manipulate objects within the containment means;

means for providing a stable, non-reactive atmosphere within the containment means;

means for drying the stable, non-reactive atmosphere;

means for reducing static charges within the containment means;

means for preparing a sample under test within the containment means;

means for weighing a substance under test within the containment means;

means for restraining a test animal; and means for neutralizing any toxic substance residue.

13. A toxic substance containment and test system, comprising:

a fume hood comprising an air exhaust system and a toxic substance filter;

a compartment positioned within the fume hood, comprising an airtight seal, a pair of glove ports through which an operator can manipulate objects within the compartment, and an exit port for removing a test sample;

a source of a non-reactive gas coupled to the compartment to provide a stable atmosphere within;

an inline moisture trap coupled to the source of non-reactive gas to dry the non-reactive gas;

an ion neutralizer coupled to the source of non-reactive gas to reduce static charges within the compartment;

a staging area in the compartment for preparing a sample under test;

a balance positioned within the compartment to measure a substance under test;

a stanchion positioned within the fume hood for holding a test animal;

an air shield positioned in front of the exit port of the glove bag and the animal stanchion; and decontaminating apparatus for cleaning up toxic substance residue comprising a suction hose having an inlet and an outlet, the suction hose inlet positioned within the glove bag and the suction hose outlet coupled to a vacuum source, and further comprising a container of decontaminating solution coupled between the suction hose outlet and the toxic substance filtered vacuum source;

wherein the compartment comprises a glove bag;

wherein the source of non-reactive gas comprises nitrogen;

further comprising means to enhance the visibility of a substance under test.

14. The toxic substance containment and test system of claim 13 wherein the means to enhance the visibility of the substance under test comprises a source of illumination.

15. The toxic substance containment and test system of claim 13 wherein the source of illumination provides light at a wavelength that excites a fluorescent property of the substance under test.

16. The toxic substance containment and test system of claim 15 wherein the fluorescent property of the substance under test is induced by a fluorescent dye.

* * * * *